W. F. REED.
SCREW HEAD SLOTTING MECHANISM FOR SCREW MAKING MACHINES.
APPLICATION FILED MAY 22, 1913.
1,085,631.
Patented Feb. 3, 1914.
2 SHEETS—SHEET 1.
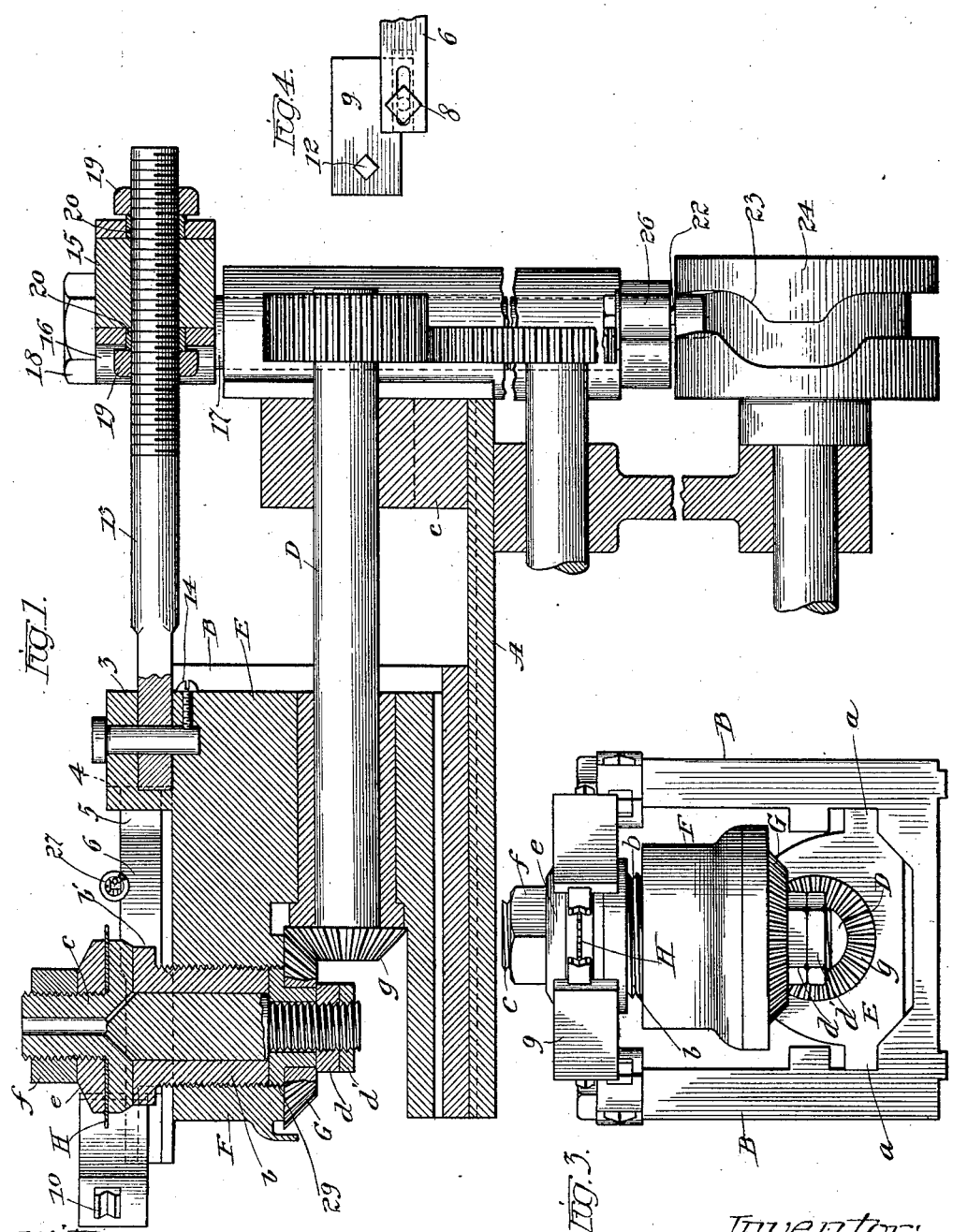

W. F. REED.
SCREW HEAD SLOTTING MECHANISM FOR SCREW MAKING MACHINES.
APPLICATION FILED MAY 22, 1913.
1,085,631.
Patented Feb. 3, 1914.
2 SHEETS—SHEET 2.
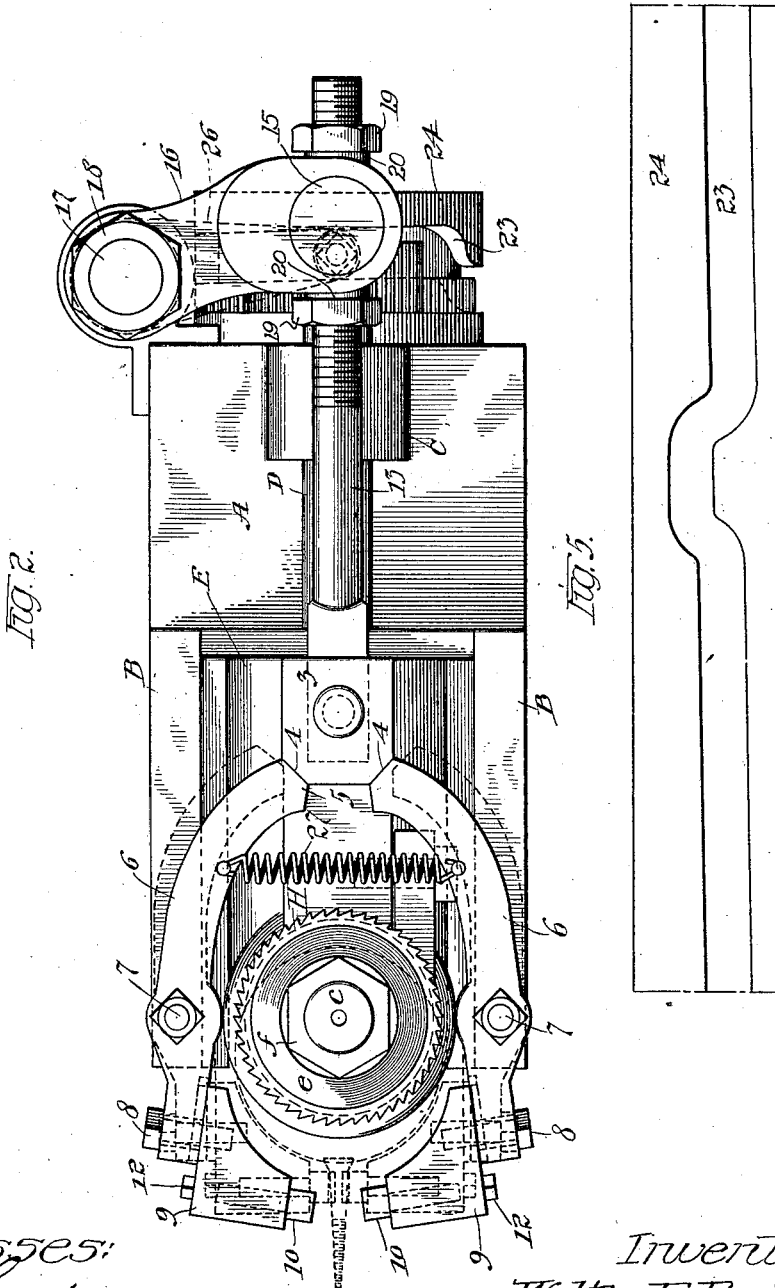

UNITED STATES PATENT OFFICE.

WALTER F. REED, OF CHICAGO, ILLINOIS, ASSIGNOR TO GEORGE J. DUNBAUGH, OF CHICAGO, ILLINOIS.

SCREW-HEAD-SLOTTING MECHANISM FOR SCREW-MAKING MACHINES.

1,085,631. Specification of Letters Patent. Patented Feb. 3, 1914.

Application filed May 22, 1913. Serial No. 769,170.

*To all whom it may concern:*

Be it known that I, WALTER F. REED, a citizen of the United States, residing at Chicago, in the county of Cook and State of Illinois, have invented new and useful Improvements in Screw - Head - Slotting Mechanism for Screw-Making Machines, of which the following is a full, clear, and exact description.

My invention relates to improvements in the screw-head slotting mechanism of screw-making machines, and particularly to the screw-head slotting mechanism of wood screw making machines.

The objects of my invention are, first, to move the saw from the slot made in the head of the screw positively, without the aid of springs such as now in use in screw-making machinery, and thus make it withdraw from the screw blank so that the saw, as the two elements are separated, will not nick nor cut away any portion of the face of the head of the screw-blank; second, to so adjust the devices connecting the rear extension of the saw carrier with the means through the medium of which the actuating cam reciprocates said carrier as to gage the depth of the slot of transverse kerf in the face of the screw blank, and, third, to make it possible for a new actuating cam to be substituted, whenever it is desired to slot small sized screws, so that the length of time the saw engages the work to cut the slot in the small screw will be the same as the time said saw would occupy in cutting a slot in a larger screw, thus making it possible to save the wear of the saw-teeth when slotting said small screw. This I accomplish by the means and in the manner fully described and as particularly pointed out in the claims.

In the drawings: Figure 1 is a longitudinal central section of my invention. Fig. 2 is a plan view thereof. Fig. 3 is a front end view. Fig. 4 is a detail view of the forward broken away end of one of the jaws, and Fig. 5 is a pattern plan of the cam of my improved mechanism.

My improvements are more particularly adapted to be applied to a wood screw making machine, but as it is unnecessary to change the construction or operation of the rest of the machine, I deem it is unnecessary to describe the other mechanism thereof, and consider it sufficient to state that the supporting frame-work of my improvements is situated and secured upon the frame-work of the remainder of the machine in such manner that the revolving screw blank holder of the latter will bring said blank at stated intervals of time, between the clamping bits of the jaws of my improvements, as will hereinafter be more fully explained.

The principal parts of my invention are supported and assembled in their relative positions by a metal frame-work comprising a base-plate A and two corresponding side-walls B arising from the side edges of the base-plate. This base-plate has a suitable bearing C mounted thereon adjacent to and parallel with its rear transverse edge, and a longitudinal shaft D is journaled in this bearing and extends longitudinally forward to and has its forward end journaled in alining bearings in a reciprocable carrier-block E. The upper surface of the base-plate, between the walls B, B, is channeled out, and longitudinal grooves are made in the inner surfaces of said walls near their bases to receive the bottom and the side tenons $a$, $a$, of block E to guide and control the movements of the same. The forward end of this block has an overhanging boss F projecting from its upper portion, and this boss is bored out vertically to receive an exteriorly screw-threaded bushing $b$. A saw arbor $c$ is journaled in this bushing, the upper end of which is provided with a concentric circular flange, the shoulders of which rest upon and are supported by the upper surface of the annular flange $b'$ of the bushing. Below the lower end of said bushing the saw arbor is reduced in diameter and exteriorly screw-threaded, and a flanged sleeve 29 is screwed into the lower end of the bore in which the bushing is seated and up flush against the lower end of said bushing so as to clamp the latter securely in position and its lower portion constitutes a journal upon which the gear G is mounted. Below this nut a miter-gear G is mounted on the reduced lower end of the arbor and is retained in position by means of a nut and lock-nut $d$ and $d'$. This miter-gear is engaged by a pinion $g$ on the reduced forward end of the shaft D, and as the latter always turns to the left, the reduced forward end portion thereof is provided with a left-hand screw so that the engagement of the said pinion with the gear G will always keep it retained on the end of the shaft. The saw arbor extends above the circumferential flange and is screw-threaded, and a saw H of suitable diameter is placed down over this upper screw-threaded arbor extension and is held in place by a circular plate or cap e and a nut f.

In operation, a small jet of water or drops of lubricant are dropped on the saw teeth. In order to prevent this liquid from falling onto miter-gear G, the lower edge of the boss F is provided with an overhanging edge or skirt which directs the moisture away from said gear. The rear end of the reciprocable saw carrier is provided with a suitable standard 3, which is, preferably, rectangular in cross-section and has the upper portion of its forward vertical edges beveled to provide wedging surfaces 4, 4, that are adapted to engage the rear end of the inwardly curved rear extensions 5, 5, of corresponding jaws 6, 6. These jaws are fulcrumed nearer their forward ends by studs 7, 7, upon the upper edges of the side walls B, B, of the supporting-frame near their forward ends, and said jaws, preferably, extend straight forward from their fulcrums a corresponding distance, and the relative positions of the extensions of these jaws to the wedged surfaces of standard 3 are always the same, and they are kept continually in engagement with the same by means of a transverse coil contraction spring 27 one end of which is secured to one extension and the other end to the other extension. Secured to the opposing sides of the forward ends of these jaws by means of bolts 8 are holders 9. These holders project forward beyond the extremities of the jaws, and the tools 10 for holding the screws are secured in suitable transverse seats therein, by means of set-screws 12, in such manner that the engaging ends of said bits extend transversely beyond the opposing surfaces of the holders. The engaging ends of these bits have horizontal V-shaped grooves cut therein so that when said jaws are moved toward each other, just before the saw carrier moves forward to bring the saw into engagement with the face of the head of the screw, the barrel or neck of the screw-blank, which has been automatically brought into proper position, will be clamped between said bits and brought to a positive given center adjacent their ends and securely clamped in this position so that the saw will always cut the groove in the face of the head of the screw in the same transaxially plane in each instance.

The means for reciprocating the saw carrier comprise a longitudinally disposed bar 13 the forward end of which is flattened and pushed into a suitable recess or seat made in the rear surface of the upper end of the standard in which it is secured by means of a vertical pin that is locked in position by a set-screw 14. The rear portion of this bar 13 is screw-threaded and extends through a pivotal boss 15 suitably secured between the bifurcations of a bent arm 16, the opposite end of which latter is mounted upon the upper end of a vertical rock-shaft 17, and retained thereon by a nut 18 on its upper reduced screw-threaded end. This pivotal boss can be adjusted longitudinally on the screw-threaded portion of bar 13 by means of gage-nuts 19, 19, between which and said boss sleeves 20, 20, are interposed to hold said nuts out beyond the edges of said bifurcations where they can be manipulated by a wrench without interference.

The rock-shaft 17 extends down through suitable bearings connected with the main frame of the machine and its lower end is adapted to receive the boss of a transversely projecting arm 26, that is retained thereon by a suitable nut (not shown). The outer end of arm 26 has a smooth barreled stud 22 depending therefrom, and this stud enters the groove or run 23 in the periphery of a circular cam 24. The course of this groove is such that the advance of the saw carrier and the saw to the face of the blank, and the withdrawal of the saw therefrom is positive, and before the blank is automatically moved away from the position in which the face of its head is slotted the saw will be so far withdrawn that there is absolutely no possibility for the face of the screw being nicked or partly cut away, as so often happens in machines wherein the saw is withdrawn through the operation of springs.

What I claim as new is:—

1. In a screw making machine, a saw, arbor therefor, a reciprocable carrier in which said arbor is journaled, and a pair of clamping jaws the fulcrums of which are stationary, and which are adapted to be actuated by said carrier.

2. In a screw making machine, a saw, arbor therefor, a reciprocable carrier in the forward end of which said arbor is journaled and which is provided with a vertically projecting member having beveled surfaces, a pair of clamping jaws having stationary fulcrums and rearward extensions that are engaged by said beveled surfaces of said carrier.

3. In a screw making machine, a saw, arbor therefor that is longitudinally adjustable, a reciprocable carrier in which said arbor is journaled, and a pair of clamping jaws the fulcrums of which are stationary and which are adapted to be actuated by said carrier.

4. In a screw making machine, a saw, arbor therefor, a reciprocable carrier in the forward end of which said arbor is journaled, a pair of clamping jaws the fulcrums of which are stationary, a rock-shaft disposed at an angle to the direction in which said carrier moves, an arm projecting from said rock-shaft, and means for connecting said arm to said carrier.

5. In a screw making machine, a saw, arbor therefor, a reciprocable carrier in the forward end of which said arbor is journaled, a pair of clamping jaws the fulcrums of which are stationary, a rock-shaft disposed at an angle to the direction in which said carrier moves, an arm projecting from said rock-shaft, and adjustable means for connecting said arm to said carrier.

6. In a screw making machine, a saw, arbor therefor, a reciprocable carrier in the forward end of which said arbor is journaled, a pair of clamping jaws the fulcrums of which are stationary, a rock-shaft disposed at an angle to the direction in which said carrier moves, an arm projecting from said rock-shaft, means for connecting said arm to said carrier, an arm on the end of said rock-shaft farthest from said carrier, and a cam adapted to engage said last-mentioned arm.

7. In a screw making machine, a saw, arbor therefor, a reciprocable carrier in the forward end of which said arbor is journaled, a pair of clamping jaws the fulcrums of which are stationary, a rock-shaft disposed at an angle to the direction in which said carrier moves, an arm projecting from said rock-shaft, means for connecting said arm to said carrier, another arm on the end of said rock-shaft farthest from said carrier having a stud projecting therefrom, and a cam having a peripheral groove which is engaged by said stud projecting from said last-mentioned arm.

8. In a screw making machine, a saw, arbor therefor, a reciprocable carrier in which said arbor is journaled, a longitudinal drive-shaft journaled in and movable with said carrier, gearing connecting the forward end of said shaft and the adjacent end of said arbor, and a pair of clamping jaws the fulcrums of which are stationary, and which are actuated by said carrier.

9. In a screw making machine, a saw, a longitudinally adjustable arbor therefor, a reciprocable carrier in which said arbor is journaled at right angles to the movement of the carrier, a longitudinal drive-shaft journaled in said carrier, gearing connecting the adjacent ends of said shaft and arbor, and a pair of clamping jaws the fulcrums of which are stationary and which are actuated by said carrier.

10. In a screw making machine, a saw, a longitudinally adjustable arbor therefor, a reciprocable carrier in which said arbor is journaled and which is provided with a vertically projecting member having its forward edges beveled at an angle to the movement of the carrier, a longitudinal drive-shaft journaled in said carrier, gearing connecting the adjacent ends of said shaft and arbor, and a pair of clamping jaws the fulcrums of which are stationary and having rearwardly extensions that are engaged by said beveled edges, and which are actuated by said carrier.

11. In a screw making machine, a saw, arbor therefor and reciprocable bearings for the same, a pair of clamping jaws the fulcrums of which are stationary, and bits secured transversely in the ends of said jaws having corresponding grooves in their engaging ends to receive the screw blanks, and said grooves being in the same horizontal plane with said saw.

12. In a screw making machine, a saw, arbor therefor and reciprocable bearings for the same, a pair of clamping jaws the fulcrums of which are stationary, and bits secured transversely in the ends of said jaws having corresponding grooves in their engaging ends to receive the screw blanks that are longitudinally and transversely adjustable, and said grooves being in the same horizontal plane with said saw.

13. In a screw making machine, a saw, a longitudinally adjustable arbor therefor and reciprocable bearings for the same, a pair of clamping jaws the fulcrums of which are stationary, and bits secured transversely in the ends of said jaws having corresponding grooves in their engaging ends to receive the screw blanks, said bits being longitudinally and transversely adjustable, and said grooves being in the same horizontal plane with said saw.

In witness whereof I have hereunto set my hand this 19th day of May, 1913.

WALTER F. REED.

Witnesses:
FRANK D. THOMASON,
E. K. LUNDY.

Copies of this patent may be obtained for five cents each, by addressing the "Commissioner of Patents, Washington, D. C."